US011898506B1

(12) United States Patent
Gerstner et al.

(10) Patent No.: US 11,898,506 B1
(45) Date of Patent: Feb. 13, 2024

(54) TWO STAGE MIXED FUEL SENSING SYSTEM

(71) Applicant: Caterpillar Inc., Peoria, IL (US)

(72) Inventors: Michael David Gerstner, Peoria, IL (US); Daniel Raymond Baldwin, Mossville, IL (US); Robert Graumüller, Kiel (DE)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 18/323,897

(22) Filed: May 25, 2023

(51) Int. Cl.
*F02B 3/00* (2006.01)
*F02D 19/06* (2006.01)

(52) U.S. Cl.
CPC ....... *F02D 19/061* (2013.01); *F02D 19/0634* (2013.01); *F02D 19/0649* (2013.01); *F02D 19/0665* (2013.01); *F02D 19/0673* (2013.01); *F02D 19/0684* (2013.01); *F02D 19/0689* (2013.01); *F02D 19/0694* (2013.01); *F02D 2200/0611* (2013.01); *F02D 2200/0614* (2013.01)

(58) Field of Classification Search
CPC ............... F02D 19/081; F02D 19/0655; F02D 19/084; F02D 19/0665; F02M 25/0228; F02M 25/025
USPC ........................................................... 123/294
See application file for complete search history.

(56) References Cited

U.S. PATENT DOCUMENTS 7,721,720 B2 * 5/2010 Payne ................. F02D 19/0621 701/112
8,006,677 B2 * 8/2011 Williams ............ F02D 19/0694 123/575
9,869,254 B2 1/2018 Ahlinder
2011/0137470 A1 * 6/2011 Surnilla ................. G01C 21/26 700/282
2013/0312690 A1 11/2013 Ferrie
2014/0366843 A1 12/2014 Hälleberg
2016/0377019 A1 * 12/2016 Russ ................... F02D 41/3094 123/486

FOREIGN PATENT DOCUMENTS

DE 102007030798 A1 1/2009

* cited by examiner

*Primary Examiner* — Long T Tran
*Assistant Examiner* — James J Kim
(74) *Attorney, Agent, or Firm* — Lee & Hayes, P.C.

(57) ABSTRACT

An internal combustion engine system is described herein. The internal combustion engine system uses one or more fuels that may be hydrophilic. The system uses a water measuring sensor to determine the concentration of water in the hydrophilic fuel. To meet power demands, the system uses the measured water concentration to modify data stored in a fuel map. The fuel map provides a controller the pump speeds and mixing ratio of the fuels for a given power level. The system receives that data and modifies it based on the measured concentration of water.

20 Claims, 4 Drawing Sheets

TWO STAGE MIXED FUEL SENSING SYSTEM

TECHNICAL FIELD

The present disclosure relates to internal combustion engines, and more particularly, to compensating for water absorbed by one of the fuels in a dual fuel system.

BACKGROUND

Internal combustion engines are widely used in various industries. Internal combustion engines can operate on a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. In an attempt to reduce greenhouse gases (GHG), some endeavors have been made to change the primary fuel used in combustions engines from fuels such as diesel, to alcohol fuels such as ethanol and methanol, or combinations of these fuels. When various types of fuels are mixed, such as diesel and methanol, in order to maintain or deliver a desired power from the engine, the amount of methanol in the fuel mixture may impact the combustion power of the mixture.

Some efforts have been made to determine and/or control the content of methanol in a fuel mixture. For example, U.S. Patent Application Publication No. 2013/0312690 ("the '690 application") describes a process in which fuel volumes are used to calculate relative volumes of fuels introduced into an engine. The '690 application describes determining a volume of premixed fuel, i.e., the fuel before the new fuel to be mixed is introduced, and then determining a volume of the new fuel. The system of the '690 application measures combustion results and extrapolates from the data the percent volume of the old fuel and new fuel in the mixture. However, the system (and process) described in the '690 application suffers from a variety of shortfalls. For example, because the mixed fuel is already in use before the contents of the mixed fuel are determined, the mixed fuel may not meet current operational needs, and in some instances, the composition of the mixed fuel can damage the engine during operation. Further, because the mixture is not known prior to its introduction into the engine for combustion, the system described in the '690 application requires a period of stabilization in order for engine to operate at steady state. As a result, the system of the '690 application may not be suitable for use in environments having dynamic or changing power needs.

Some examples of the present disclosure are directed to overcoming these and other deficiencies of such systems.

SUMMARY

One aspect of the presently disclosed subject matter describes an internal combustion engine having a combustion cylinder, an injector fluidly connected to the combustion cylinder, the injector being configured to receive a fuel mixture via a fuel line, the fuel mixture comprising a first fuel and a second fuel, a first fuel pump fluidly connected to a first fuel tank, the first fuel pump being configured to direct the first fuel from the first fuel tank to a mixing valve fluidly connected to the fuel line, a second fuel pump fluidly connected to a second fuel tank, the second fuel pump being configured to direct the second fuel from the second fuel tank to the mixing valve, a first water sensor configured to detect a volume of water in the second fuel stored in the second fuel tank and output a first water volume signal, a second water sensor configured to detect a volume of water in an output of the mixing valve and output a second water volume signal, and a controller configured to receive a power signal indicating a desired power level of the internal combustion engine, determine, based on the desired power level, a default ratio of the second fuel to the first fuel, a flowrate of the first fuel, and a flowrate of the second fuel, determine a concentration of water in the second fuel stored in the second fuel tank based on the first water volume signal, modify the default ratio, the flowrate of the first fuel, and the flowrate of the second fuel based on the concentration of the water in the second fuel, determine a concentration of water in the output of the mixing valve, and modify the flowrate of the first fuel and the second fuel based on the determination of the concentration of water in the output of the mixing valve.

In another aspect, the presently disclosed subject matter describes a controller for controlling an internal combustion engine, the controller having a memory storing computer-executable instructions, and a processor in communication with the memory, the computer-executable instructions causing the processor to perform acts comprising receiving a power signal indicating a desired power level of the internal combustion engine, accessing a fuel map to calculate a default ratio of a second fuel to a first fuel and a flowrate of the first fuel and the second fuel, wherein the fuel map is a table indicating that for a power level, an amount of the first fuel and an amount of the second fuel for the power level, calculating a concentration of water absorbed by the second fuel stored in a second fuel tank based on a water volume signal received from a water sensor, modifying the default ratio, the flowrate of the first fuel, and the flowrate of the second fuel based on the concentration of the water in the second fuel, outputting a mixing signal to modify a position of a mixing valve based on modifying the default ratio, and outputting a first fuel pump signal to change the flowrate of the first fuel pump and a second pump signal to change the flowrate of the second fuel pump based on modifying the flowrate of the second fuel and the first fuel based on the concentration of the water in the second fuel.

In a still further aspect, the presently disclosed subject matter describes a method of operating an internal combustion engine including receiving a power signal indicating a desired power level of the internal combustion engine, accessing a fuel map to calculate a default ratio of a second fuel to a first fuel and a flowrate of the first fuel and the second fuel, wherein the fuel map is a table indicating that for a power level, an amount of the first fuel and an amount of the second fuel for the power level, calculating a concentration of water absorbed by the second fuel stored in a second fuel tank based on a water volume signal received from a water sensor, modifying the default ratio, the flowrate of the first fuel, and the flowrate of the second fuel based on the concentration of the water in the second fuel, outputting a mixing signal to modify a position of a mixing valve based on modifying the default ratio, and outputting a first fuel pump signal to change the flowrate of the first fuel pump and a second fuel pump signal to change the flowrate of the second fuel pump based on modifying the flowrate of the second fuel and the first fuel based on the concentration of the water in the second fuel

DETAILED DESCRIPTION

Figure 1:
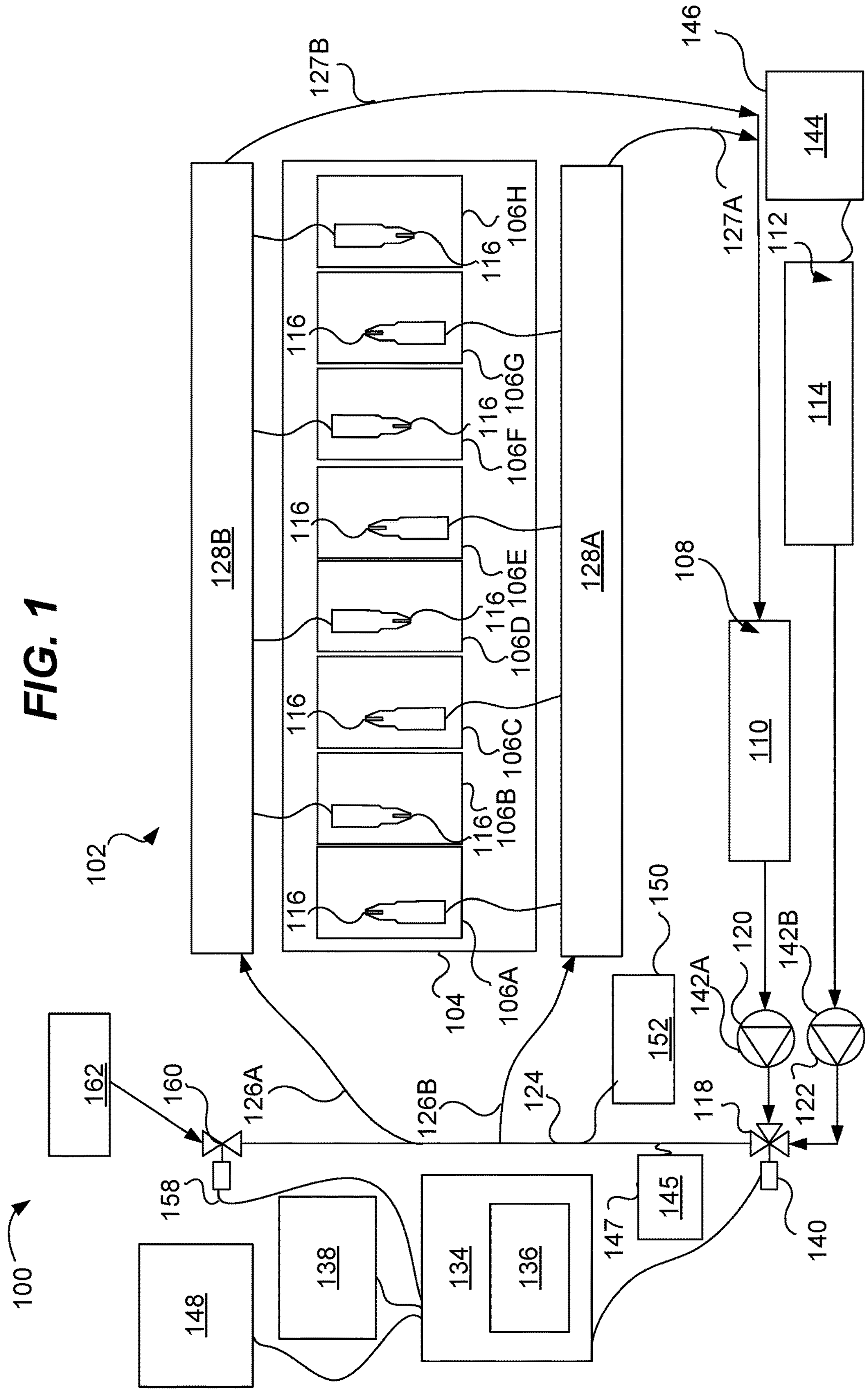
FIG. 1 illustrates an internal combustion engine system that compensates for water absorbed by a fuel, in accordance with various embodiments of the presently disclosed subject matter.

Wherever possible, the same reference numbers will be used throughout the drawings to refer to the same or like parts. FIG. 1 illustrates an internal combustion engine system 100 capable of using a mixture of fuels, in accordance with various embodiments of the presently disclosed subject matter. The internal combustion engine system 100 includes an internal combustion engine 102 having a cylinder block 104. A plurality of combustion cylinders 106A-106H (hereinafter referred to individually as "the combustion cylinder 106A," "the combustion cylinder 106B," and the like, and collectively as "the combustion cylinders 106,") are formed in the cylinder block 104, and can have any suitable arrangement such as a V-pattern, an inline pattern, or still others. The internal combustion engine 102 may have any number of combustion cylinders 106. It will be understood that the combustion cylinders 106 are associated with a piston (not shown) movable between a top dead center position and a bottom dead center position in a generally conventional manner, typically in a four-stroke engine cycle, though other combustions cycles may be used and are considered to be within the scope of the presently disclosed subject matter. The pistons will be coupled with a crankshaft (not shown) rotatable to provide torque for purposes of vehicle propulsion, operating a generator for production of electrical energy, or in still other applications such as operating a compressor, a pump, or various other types of equipment.

The internal combustion engine 102 is fueled by a first fuel 108 stored in a first fuel tank 110 and a second fuel 112 stored in a second fuel tank 114. The first fuel 108 may include a higher cetane/lower octane liquid fuel, and the second fuel 112 may include a lower cetane/higher octane liquid fuel. The terms "higher" and "lower" in this context may be understood as relative terms in relation to one another. Thus, the first fuel 108 may have a higher cetane number, and a lower octane number, than a cetane number and an octane number of the second fuel 112. The first fuel 108 might include a diesel distillate fuel, dimethyl ether, biodiesel, Hydrotreated Vegetable Oil (HVO), Gas to Liquid (GTL) renewable diesel, any of a variety of liquid fuels with a cetane enhancer, or still another fuel type. The second fuel 112 may include an alcohol fuel such as methanol or ethanol, Naptha, for example, or still other fuel types. For the purposes of FIG. 1, the first fuel 108 is described as diesel fuel and the second fuel 112 is described as methanol, though as noted above, the presently disclosed subject matter may be used with other fuel types.

The combustion cylinders 106 includes injectors 116. In various examples, the first fuel 108 or the second fuel 112 is supplied to the injectors 116 through mixing valve 118. The mixing valve 118 can receive the first fuel 108 from a first fuel pump 120. The first fuel pump 120 is in fluidic communication with the first fuel tank 110 and pumps the first fuel 108 into the mixing valve 118. The mixing valve 118 also receives the second fuel 112 from a second fuel pump 122. The second fuel pump 122 is in fluidic communication with the second fuel tank 114 and pumps the second fuel 112 from the second fuel tank 114 to the mixing valve 118. The mixing valve 118 is a proportional valve that receives the first fuel 108 and the second fuel 112 and, based on a position of the mixing valve 118, the mixing valve 118 outputs a ratio of the first fuel 108 to the second fuel 112. For example, the mixing valve 118 can be positioned to output only the first fuel 108 or the second fuel 112 or various ratios thereof. It should be noted that the presently disclosed subject matter is not limited to the manner in which the first fuel 108 and the second fuel 112 are combined (mixed), as other technologies may be used and are considered to be within the scope of the presently disclosed subject matter. Additionally, it should be noted that the use of a mixed fuel comprised of two or more fuels is merely for purposes of illustrating an example of the presently disclosed subject matter, as various examples of the presently disclosed subject matter can be used in systems in which a hydrophilic fuel is injected separately into an internal combustion engine from another fuel.

The output of the mixing valve 118 enters fuel line 124, into feed lines 126A and 126B, and thereafter into fuel rails 128A and 128B. As used herein, a "rail" is a fuel line that supplies fuel to injectors, such as the injectors 116. It should be noted that the fuel rails 128A and 128B are illustrated as separate rails. In some examples, the fuel rails 128A and 128B are one or more rails that provide the first fuel 108, second fuel 112, or mixtures thereof, to the injectors 116. It should be further noted that internal combustion engine 102 may receive the output of the mixing valve 118 in manners different than the use of the fuel line 124, the feed lines 126A and 126B, and fuel rails 128A and 128B described in FIG. 1. Unused fuel, either the first fuel 108, the second fuel 112, or mixtures thereof, are transferred back to the first fuel tank 110 through return lines 127A and 127B. In some examples, unused fuel may also be transferred to a different storage tank (not illustrated). In some examples, unused fuel may be cooled and recirculated back downstream of the mixing valve 118.

The amount of fuel, and the mixture of the fuel between the first fuel 108 and the second fuel 112, is controlled by the controller 134. The controller 134 can be a component or module of an engine control unit (ECU) or engine control module (ECM) associated with the combustion engine 102. In some examples, the controller 134 controls the amount of the mixed fuel and the mixture of the fuel between the first fuel 108 and the second fuel 112. The controller 134 is implemented by one or more processors having instructions stored in one or more memory devices that control the amount of fuel and mixture. To determine the amount of fuel of a mixture of fuels to provide the internal combustion engine 102 for a given power level, the controller 134 has stored, in a memory accessible by the controller 134, a fuel map 136. The fuel map 136 is a table indicating an amount of fuel and/or particular amounts of two or more fuels required for the internal combustion engine 102 to generate a desired output (e.g., engine speed, torque, etc.). In some examples, the fuel map 136 may additionally or alternatively comprise one or more algorithms or other components by which the controller 134 may determine an amount of fuel and/or particular amounts of two or more different fuels based on a desired engine speed, torque, or other such output. In some examples, the fuel map 136 is used by the controller 134 to control a pulse width of the injectors 116 using injector signals 138. A "pulse" is an electrical signal having an amplitude, wavelength, and frequency that is used by the controller 134 to operate a component, such as one of the fuel injectors 116. The presently disclosed subject matter is not limited to any particular type of waveform of the pulse. The injector signals 138 are pulses that, when high or powered, cause the injectors 116 to open to allow the flow of fuel for ignition. In order to deliver the fuel required for a particular pulse width (i.e., the amount of time the injectors 116 are open), the fuel map 136 also includes the pump flowrates and position of the mixer valve 118 to provide the desired fuel rate and mixture. For example, the fuel map 136 may indicate that for a power demand from five percent (5%) of total power to twenty percent (20%) of total power of the internal combustion engine 102, the mixture of the first fuel 108 to the second fuel 112 is to be 20% of the first fuel 108 to 80% of the second fuel 112. The controller 134 issues a mixing signal 140 to configure the mixing valve 118 to cause an output of the mixing valve 118 to be 80% by volumetric flow the second fuel 112 and 20% by volumetric flow the first fuel 108. To meet the volumetric flowrate demands indicated by the fuel map 136 for the power demand increase, the controller 134 also generates and provides corresponding pump signals 142A and 142B. The pump signal 142A is used to control the pump speed of the first fuel pump 120 and the pump signal 142B is used to control the pump speed of the second fuel pump 122. In this example, the controller 134 issues the pump signals 142A and 142B to the motors or controllers of the first fuel pump 120 and the second fuel pump 122 to cause an increase of the speed of the first fuel pump 120 and/or the second fuel pump 122. It should be noted that the presently disclosed subject matter is not limited to any particular manner of controlling or determining flowrates or valve positions for mixing fuels.

In some examples, the second fuel 112 may have within the volume of the second fuel 112 one or more contaminants that reduce the amount of combustion power that can, absent the contaminant, be provided by the combustion of the second fuel 112. One of the contaminants may be water. For example, the second fuel 112 may be "hydrophilic," meaning, the second fuel 112 has a tendency to mix with (or absorb) water. Some examples of fuels that tend to be hydrophilic are ethanol and methanol. Ethanol is hydrophilic because it contains one terminal and polar hydroxyl group in its structure. This hydroxyl group (OH group) forms hydrogen bond with water molecule. This hydrogen bonding between OH group and water enhances the water solubility of ethanol. Methanol is hydrophilic because it is a nonsymmetric molecule. One end of the methanol molecule (the group CH3) is non-polar, while the other (OH) is polar. As with the ethanol molecule, the OH group of the methanol tends to build a strong bond with water. Other examples of hydrophilic fuels that may be used in various applications include, but are not limited to, n-propyl alcohol, isopropyl alcohol, and t-butyl alcohol.

Because water does not contribute to combustion, as the concentration of water in the second fuel 112 varies, the power output of the internal combustion engine 102 varies. This results in a deviation of the expected power output indicated in the fuel map 136 to an actual, lower power output caused by the water. For example, the combustion of a 50/50 mixture of the first fuel 108 to the second fuel 112 will produce more power than 50/40/10 mixture of the first fuel 108/second fuel 112/water (assuming all other conditions are equal) because water does not combust, and actually, retards combustion. In some situations, the introduction of water into the second fuel 112 can be disadvantageous because of the reduced power achieved. Thus, when water is introduced into the second fuel 112, the accuracy of the fuel map 136 can be decreased. To maintain the ability of the internal combustion engine 102 to provide a desired amount of power, water concentration, in the present example, is measured before and after the mixing valve 118. In this manner, a water sensor 144 is provided to measure water concentrating before the mixing valve 118 and the water sensor 145 is provided to measure water concentration after the mixing valve 118. The water sensor 144 is used to detect the volume of water in the second fuel 112 stored in the second fuel tank 114. For example, the water sensor 144 can be a hydrometer that measures the specific gravity of the second fuel 112 stored in the second fuel tank 114. The specific gravity is used to determine water concentration, as the specific gravity of the second fuel 112 increases (or changes) as the second fuel 112 absorbs water. For example, the specific gravity of pure methanol at 20° C. is: 0.7913. As the methanol absorbs water, the specific gravity of the mixture will increase, reaching a maximum of 1.000 at 20° C. In the instance of methanol as the second fuel 112, a specific gravity of 0.8957 at 20° C. indicates a solution of half water and half methanol. In a similar manner, a sensor 145 is used to detect the volume (or concentration) of water in the output of the mixing valve 118 that enters fuel line 124. The sensor 145 outputs a water volume signal 147 to the controller 134 based on the detection of the volume of water in the output of the mixing valve 118 that enters fuel line 124. The presently disclosed subject matter is not limited to any particular technology or process for determining the percentage of water in the second fuel 112 or the output of the mixing valve 118 that enters fuel line 124. For example, the water sensor 144 may measure a conductivity of the second fuel 112 in the second fuel tank 114 and, based on the conductivity, determine the percentage of water in the second fuel 112.

The water sensor 144 generates and transmits a water volume signal 146 to the controller 134 based on the detection of the volume of water in the second fuel 112. The water sensor 145 transmits the water volume signal 147 to the controller 134 based on the detection of the volume of water in the output of the mixing valve 118 that enters the fuel line 124. The controller 134 compensates for the water indicated in the water volume signals 146 and 147 when controlling the pump speed and mixture of the fuels. The controller 134 uses the water volume signal 147 to adjust either the flowrates or mixing percentages, described in more detail below. For example, the controller 134 may receive a power signal 148 indicating that the power of the internal combustion engine 102 is to be fifty percent (50%) of total power available. The controller 134 accesses the fuel map 136 and determines that the mixture of the second fuel 112 to the first fuel 108 is to be a 70/30 mixture (70% second fuel 112 and 30% first fuel 108) at a first flowrate of the first fuel pump 120 and a first flowrate of the second fuel pump 122 by issuing control signals to the first fuel pump 120 and/or the second fuel pump 122 to cause the speed of the first fuel pump 120 and/or the second fuel pump 122 to change to provide the desired flowrates. However, if the controller 134 does not compensate for the water in the second fuel 112, the amount of the ignitable portion (i.e., the methanol, ethanol, and the like) of the second fuel 112 delivered to the internal combustion engine will be less than 70%.

To compensate for the water in the second fuel 112 detected by the water sensor 144, the controller 134 can perform various functions in order to achieve the requested power. In one example, the controller 134 can increase the speed of the second fuel pump 122 beyond that indicated by the fuel map 136 by an amount so that the second fuel pump 122 delivers the requested amount of the ignitable portion (i.e., the methanol, ethanol, and the like) of the second fuel 112. In other examples, the controller 134, either in addition to or in lieu of modifying pumps, the controller 134 can issue the mixing signal to increase the percentage of the second fuel 112 in the mixture in relation to the first fuel 108, thus increasing the amount of the ignitable portion (i.e., the methanol, ethanol, and the like) of the second fuel 112 entering the fuel line 124.

The controller 134 receives a volume flowrate signal 150 from a volumetric flowrate sensor 152. The volumetric flowrate signal 150 is used by the controller 134 to determine the pulse widths provided by the injector signals 138 to each of the injectors 116. An example of a control strategy may be to open the injectors to provide the required power for the engine. The duration of the injector pulse is based on power need, pressure available, and fuel mixture at the injector. The pumps may be adjusted to maintain the required pressure at the mixing valve. The mixing valve may be adjusted to maintain the volumetric flowrate based on the diesel to methanol ratio taking into account the amount of water in the methanol. It should be noted, however, that other control strategies may be used and are considered to be within the scope of the presently disclosed subject matter.

Thus, in instances in which the volumetric flowrate of the fuel in the fuel line 124 is increased to compensate for water in the second fuel 112, the controller 134 instructs the injectors 116 to remain open for a longer period of time due to the increased flowrate of the mixed fuel in the fuel line 124. The controller 134 also uses the volume flowrate signal 150 to calculate the amount of the ignitable portion (i.e., the methanol, ethanol, and the like) of the second fuel 112 entering the fuel rails 128A and 128B. For example, the water sensor 144 may determine that the second fuel 112 is 90% methanol and 10% water. With a 50/50 mixture of the first fuel 108 and the second fuel 112 set at the mixing valve 118, the controller 134 can determine that the fuel entering the fuel rails comprises 50% of the first fuel 108, 45% methanol, and 5% water. This is an example calculation used by the controller 134 to determine pump speeds, mixture, pulse widths, and the like. The controller 134 thereafter uses the information provided by the water sensor 144 to change the position of the mixing valve and/or pump speeds, described in more detail below in FIGS. 2 and 3.

The controller 134 also assists in clearing the fuel rails 128A and 128B of remaining second fuel 112 or first fuel 108, as may be required in a shutdown scenario if one of the fuels is of a volatile nature and safety considerations require purging of the fuel rails 128A and 128B upon shutdown. Thus, during an engine shutdown, indicated by the power signal 148, the controller 134 transmits gas control signal 158 to a gas valve 160. The gas control signal 158 is configured to open and close the gas valve 160, allowing an inert gas such as nitrogen 162 to enter the fuel rails 128A and 128B at a pressure great enough to force remaining fuel in the fuel rails 128A and 128B to be expelled to the first fuel tank 110, or a different tank if so configured. The controller 134 uses various signals, such as the power signal 148, to control various operations of the internal combustion engine 102, illustrated in more detail in FIG. 2.

Figure 2:
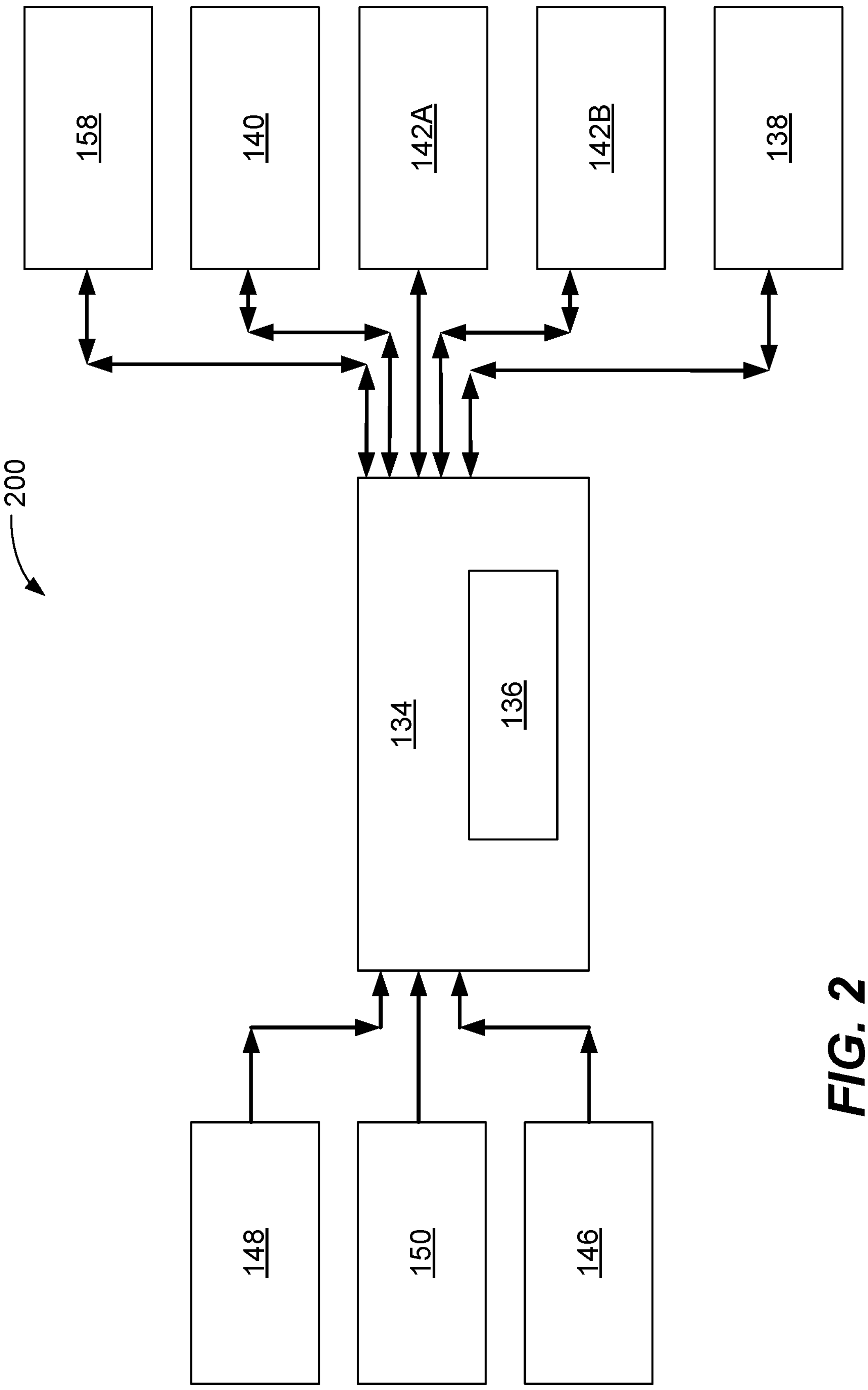
FIG. 2 is a signal diagram illustrating signal flows coming into and out of a controller that is configured to compensate for water absorbed by a fuel, in accordance with various embodiments of the presently disclosed subject matter.

FIG. 2 is a signal diagram 200 illustrating the signal flows coming into and out of the controller 134, in accordance with various embodiments of the presently disclosed subject matter. As noted above, the controller 134 uses various signals to control one or more components of the internal combustion engine system 100. It should be noted that the controller 134 may have one or more additional inputs or outputs that are not illustrated, depending on the various uses of the controller 134. For example, the controller 134 may also have stored therein a fuel/air map that is used to control the air intake system of an internal combustion engine. The signal diagram 200 illustrates the inputs and outputs of the controller 134 as it may be used to control the internal combustion engine system 100 of FIG. 1. Further, the presently disclosed subject matter is not limited to wired or wireless signal transfers, as the controller 134 may use either or a combination of both.

The controller 134 receives as an input the water volume signal 146 from the water sensor 144. The water sensor 144 can be a hydrometer that measures the specific gravity of the second fuel 112 stored in the second fuel tank 114. The specific gravity is used to determine water concentration, as the specific gravity of the second fuel 112 increases (or changes) as the second fuel 112 absorbs water. Other types of water concentration measuring technologies, such as conductivity, may also be used and are considered to be within the scope of the presently disclosed subject matter. The water sensor 144 outputs the calculated water concentration as the water volume signal 146. The controller 134 uses the water volume signal 146 to determine the percentage of the combustible portion of the fuel (e.g., ethanol, methanol, and the like) in the second fuel 112. When the controller 134 receives the power signal 148 indicating a change in requested power of the internal combustion engine 102, the controller 134 uses the calculated water percentage and the fuel map 136 to determine the flowrate of the second fuel 112 that needs to be pumped to meet the requested power of the internal combustion engine 102, an example of which is provided with respect to FIG. 1.

Once the controller 134 calculates the flowrate of the first fuel 108 and the second fuel 112, the controller 134 transmits (or issues) the pump signal 142A to control the pump speed of the first fuel pump 120 and the pump signal 142B to control the pump speed of the second fuel pump 122. The controller 134 also transmits the mixing signal 140 to adjust the flow ratio of the first fuel 108 to the second fuel 112 entering the fuel line 124. The controller 134 receives the flowrate signal 150 from the flowrate sensor 152 indicating the amount of the mixed fuel being pumped through the fuel line 124. Using the calculated water percentage, the controller 134 can monitor the amount of the second fuel 112 entering the internal combustion engine 102. To control the combustion of the internal combustion engine 102, the controller 134 transmits the injector signals 138. The injector signals 138 are provided to each of the injectors 116. The injector signals 138 are pulses that, when high or powered, cause the injectors 116 to open to allow the flow of fuel for ignition. Further, as noted above, the controller 134 also transmits the gas control signal 158 to open and close the gas valve 160 to purge the internal combustion engine 102 of the first fuel 108 and/or the second fuel 112. The process of adjusting components performed by the controller 134, as described in FIG. 2, is further illustrated in FIG. 3.

Figure 3:
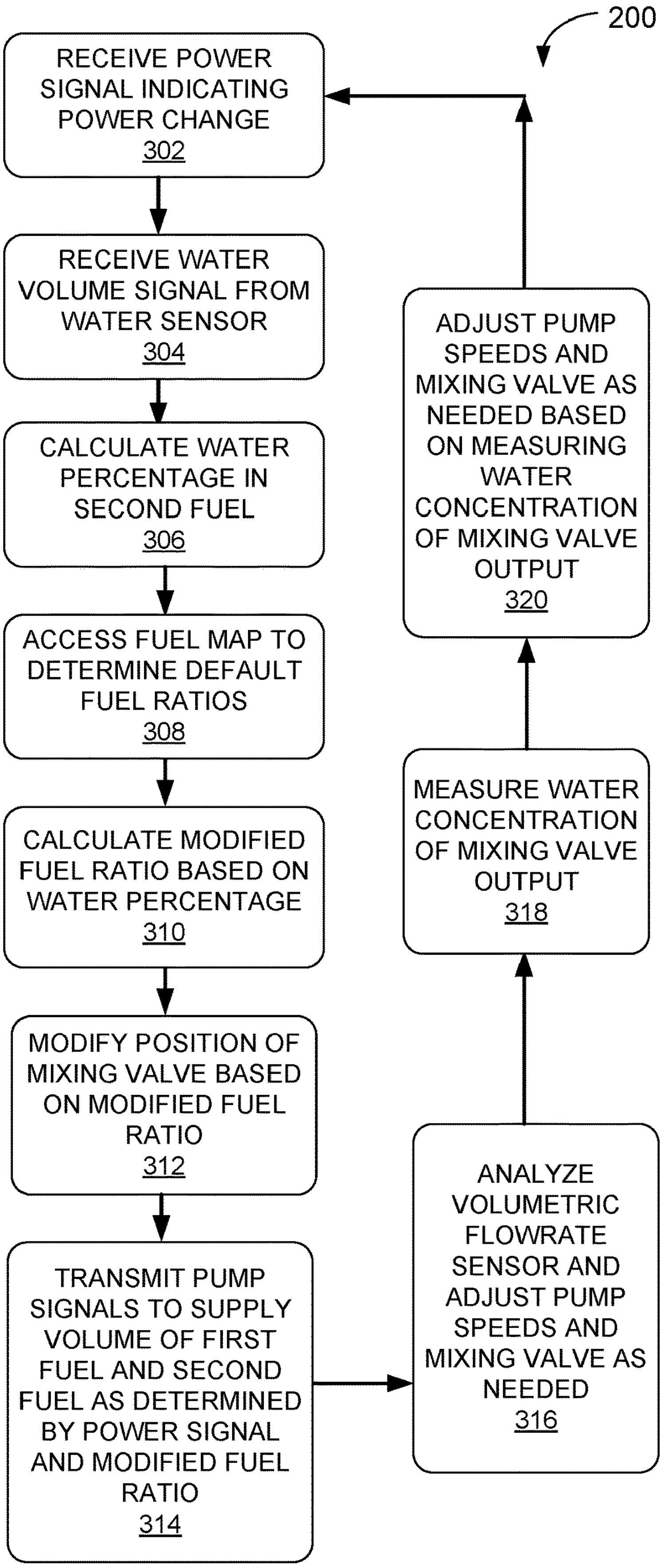
FIG. 3 illustrates a method for operating an internal combustion engine that compensates for water absorbed into a fuel, in accordance with various examples of the presently disclosed subject matter.

FIG. 3 illustrates a method 300 for operating the internal combustion engine 102 in which the controller 134 uses the water volume signal 146 to determine the percentage of the combustible portion of the fuel (e.g., ethanol, methanol, and the like) in the second fuel 112, in accordance with various examples of the presently disclosed subject matter. The method 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 300 commences at step 302, where the controller 134 receives the power signal 148 indicating a change in requested power of the internal combustion engine 102.

At step 304, the controller 134 receives as an input the water volume signal 146 from the water sensor 144. The water sensor 144 can be a hydrometer that measures the specific gravity of the second fuel 112 stored in the second fuel tank 114. The specific gravity is used to determine water concentration, as the specific gravity of the second fuel 112 increases (or changes) as the second fuel 112 absorbs water.

At step 306, the controller 132 determines the water concentration in the second fuel 112. In some examples, the water sensor 144 can generate (calculate) and output the water concentration as the water volume signal 146. The controller 134 uses the water volume signal 146 to determine the percentage of the combustible portion of the fuel (e.g., ethanol, methanol, and the like) in the second fuel 112. In some examples, the controller 134 receives the water volume signal 146 and calculates the percentage of the combustible portion of the fuel (e.g., ethanol, methanol, and the like) in the second fuel 112.

At step 308, the controller 134 accesses the fuel map 136 to determine the default flowrate of the second fuel 112 that needs to be pumped to meet the requested power of the internal combustion engine 102. The default flowrates are based on the second fuel 112 having little to no water absorbed in the second fuel 112.

At step 310, the controller 134 calculates a modified flowrate of the second fuel 112 based on the calculated water concentration. For example, the water sensor 144 or the controller 134 may calculate that the second fuel 112 is 90% methanol and 10% water. With a 50/50 mixture of the first fuel 108 and the second fuel 112 set at the mixing valve 118, the controller 134 can determine that the fuel entering the fuel rails comprises 50% of the first fuel 108, 45% methanol, and 5% water. Thus, the pump speed of the second fuel 112 may be increased to compensate for the dilution of the combustible portion (e.g., ethanol, methanol, and the like) in the second fuel 112.

At step 312, the controller 134 issues the mixing signal 140 to change the position of the mixing valve 118 to achieve the ratio of the first fuel 108 to the second fuel 112 based on the modified flowrates calculated by the controller 134.

At step 314, the controller 134 transmits the pump signals 142A and 142B to increase or decrease the speed of the first fuel pump 120 and the second fuel pump 122 to achieve the modified flowrates.

At step 316, the controller 134 analyzes the volumetric flowrate signal 150 to calculate any changes that need to be made to the position of the mixing valve 118, the first fuel pump 120, and/or the second fuel pump 122.

At step 318, the controller 134 receives the water volume signal 147 that measures the concentration of water in the output of the mixing valve 118 that enters the fuel line 124. The measuring of the concentration of water in the output of the mixing valve 118, in conjunction with measuring the concentrating of the water in the second fuel 112 provides the controller 134 with data to further compensate for the water in the second fuel 112.

At step 320, the controller 134 adjusts the position of the mixing valve 118, the speed of the first fuel pump 120, and/or the speed of the second fuel pump 122 to provide a volumetric flow rate of the first fuel 108 and the second fuel 112 to support a required power demand from the engine 102. The method 300 thereafter continues to step 302.

Figure 4:
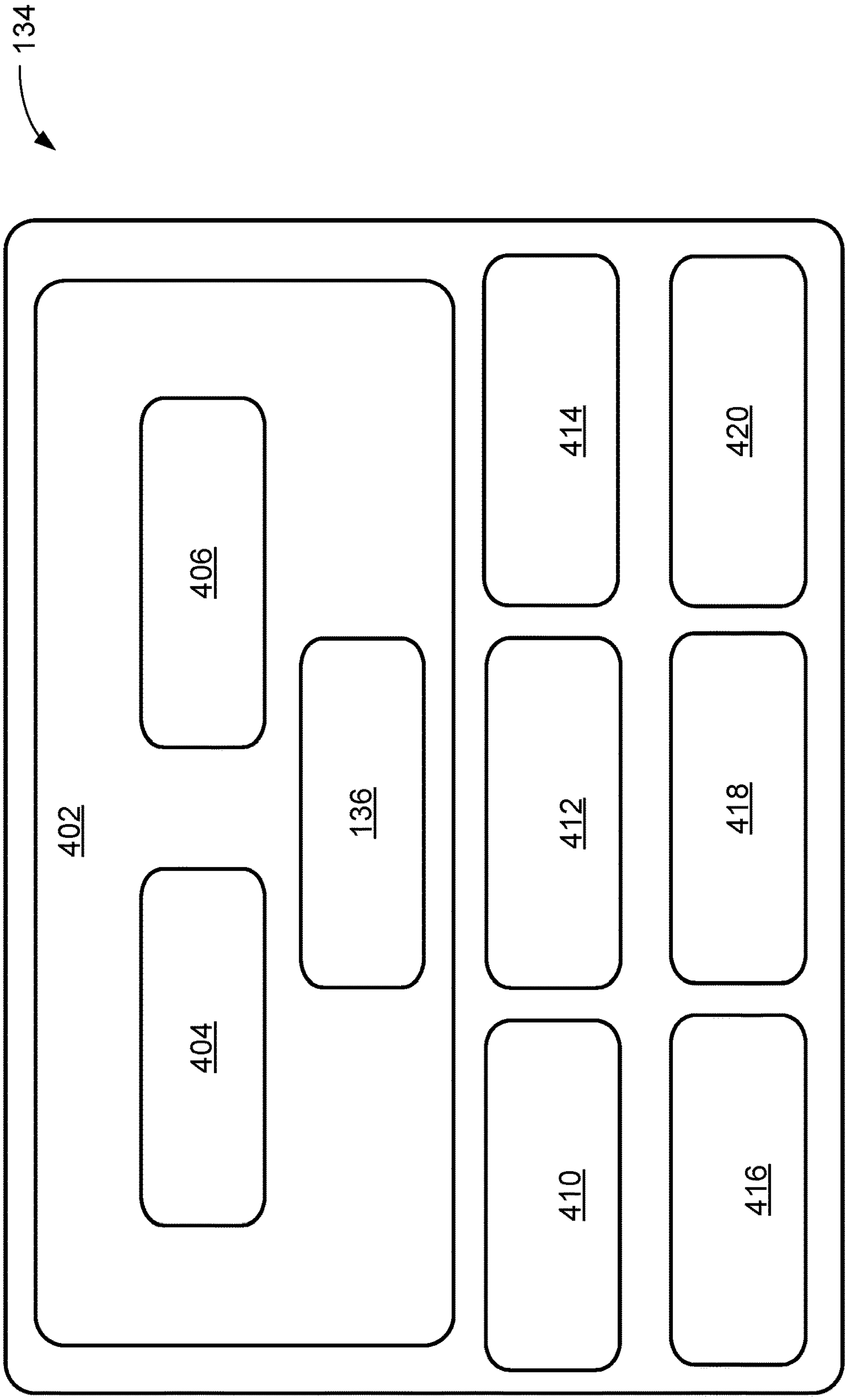
FIG. 4 depicts a component level view of a controller for use with the systems and methods described herein, in accordance with various examples of the presently disclosed subject matter.

FIG. 4 depicts a component level view of the controller 134 for use with the systems and methods described herein. The controller 134 could be any device capable of providing the functionality associated with the systems and methods described herein. The controller 134 can comprise several components to execute the above-mentioned functions. The controller 134 may be comprised of hardware, software, or various combinations thereof. As discussed below, the controller 134 can comprise memory 402 including an operating system (OS) 404 and one or more standard applications 406. The standard applications 406 may include applications that provide for receiving and calculating the modified flowrates, the concentration of water in the second fuel 112, and the like.

The controller 134 can also comprise one or more processors 410 and one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two. The memory 402 can include data pertaining to the fuel map 136, power signals 148, injector signals 138, and other information, and can be stored on a remote server or a cloud of servers accessible by the controller 134.

The memory 402 can also include the OS 404. The OS 404 varies depending on the manufacturer of the controller 134. The OS 404 contains the modules and software that support basic functions of the controller 134, such as scheduling tasks, executing applications, and controlling peripherals. The OS 404 can also enable the controller 134 to send and retrieve other data and perform other functions, such as transmitting control signals using the transceivers 416 and/or output devices 418 and receiving signals using the input devices 420.

The controller 134 can also comprise one or more processors 410. In some implementations, the processor(s) 410 can be one or more central processing units (CPUs), graphics processing units (GPUs), both CPU and GPU, or any other combinations and numbers of processing units. The controller 134 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 134. Any such non-transitory computer-readable media may be part of the controller 134 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the controller 134 and a wireless modem that is a gateway to the Internet), the Internet, and/or an intranet. Specifically, the transceiver(s) 416 can include one or more transceivers that can enable the controller 134 to send and receive data. Thus, the transceiver(s) 416 can include multiple single-channel transceivers or a multi-frequency, multi-channel transceiver to enable the controller 134 to send and receive video calls, audio calls, messaging, etc. The transceiver(s) 416 can enable the controller 134 to connect to multiple networks including, but not limited to 2G, 3G, 4G, 5G, and Wi-Fi networks. The transceiver(s) 416 can also include one or more transceivers to enable the controller 134 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 716 may include wired communication components, such as a wired modem or Ethernet port, for communicating via one or more wired networks. The transceiver(s) 416 can enable the controller 134 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

INDUSTRIAL APPLICABILITY

The present disclosure relates generally to internal combustion engines that use a hydrophilic fuel. When requested power is increased or decreased, the controller 134 uses the fuel map 136 to determine default or initial mixing valve 118 and fuel pump 120 and 122 setpoints or conditions. To account for water being a part of one of the fuels, the controller 134 uses a water sensor 144 that allows for the calculation of water concentration in a fuel. A controller 134 uses this information and modifies the flowrates and mixing valve position. Various examples of the presently disclosed subject matter allow the controller 134 to account for the contamination of water in a fuel. By compensating for water, the internal combustion engine 102 can provide the power desired by an operator of the internal combustion engine 102

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An internal combustion engine, comprising:

a combustion cylinder;

an injector fluidly connected to the combustion cylinder, the injector being configured to receive a fuel mixture via a fuel line, the fuel mixture comprising a first fuel and a second fuel;

a first fuel pump fluidly connected to a first fuel tank, the first fuel pump being configured to direct the first fuel from the first fuel tank to a mixing valve fluidly connected to the fuel line;

a second fuel pump fluidly connected to a second fuel tank, the second fuel pump being configured to direct the second fuel from the second fuel tank to the mixing valve;

a first water sensor configured to detect a volume of water in the second fuel stored in the second fuel tank and output a first water volume signal;

a second water sensor configured to detect a volume of water in an output of the mixing valve and output a second water volume signal; and a controller configured to:

receive a power signal indicating a desired power level of the internal combustion engine;

determine, based on the desired power level, a default ratio of the second fuel to the first fuel, a flowrate of the first fuel, and a flowrate of the second fuel;

determine a concentration of water in the second fuel stored in the second fuel tank based on the first water volume signal;

modify the default ratio, the flowrate of the first fuel, and the flowrate of the second fuel based on the concentration of the water in the second fuel;

determine a concentration of water in the output of the mixing valve; and modify the flowrate of the first fuel and the second fuel based on the determination of the concentration of water in the output of the mixing valve.

2. The internal combustion engine of claim 1, wherein the first fuel comprises diesel and the second fuel comprises methanol, ethanol, n-propyl alcohol, isopropyl alcohol, or t-butyl alcohol.

3. The internal combustion engine of claim 1, wherein the controller is further configured to:

receive a volumetric flowrate of mixed fuel in the fuel line from a flowrate sensor; and modify a first pump signal, a second pump signal, or a mixing signal based on the volumetric flowrate.

4. The internal combustion engine of claim 1, wherein the controller is further configured to output an injector signal to control an opening and closing of the injector based on the power signal.

5. The internal combustion engine of claim 1, wherein the first water sensor is configured to measure a specific gravity of the second fuel to generate the first water volume signal and the second water sensor is configured to measure a specific gravity of the output of the mixing valve to generate the second water volume signal.

6. The internal combustion engine of claim 1, wherein the first water sensor is configured to measure a conductivity of the second fuel to generate the first water volume signal and the second water sensor is configured to measure a conductivity of the output of the mixing valve to generate the second water volume signal.

7. The internal combustion engine of claim 1, wherein the controller is further configured to:

receive a second power signal indicating a shutdown of the internal combustion engine; and in response to receiving the second power signal, transmit a gas control signal to open a gas valve, wherein opening the gas valve allows nitrogen to enter the internal combustion engine to purge the internal combustion engine of the first fuel and the second fuel.

8. A controller for controlling an internal combustion engine, the controller comprising:

a memory storing computer-executable instructions; and a processor in communication with the memory, the computer-executable instructions causing the processor to perform acts comprising:

receiving a power signal indicating a desired power level of the internal combustion engine;

accessing a fuel map to calculate a default ratio of a second fuel to a first fuel and a flowrate of the first fuel and the second fuel, wherein the fuel map is a table indicating that for a power level, an amount of the first fuel and an amount of the second fuel for the power level;

calculating a concentration of water absorbed by the second fuel stored in a second fuel tank based on a water volume signal received from a water sensor;

modifying the default ratio, the flowrate of the first fuel, and the flowrate of the second fuel based on the concentration of the water in the second fuel;

outputting a mixing signal to modify a position of a mixing valve based on modifying the default ratio; and outputting a first pump signal to change the flowrate of the first fuel pump and a second pump signal to change the flowrate of the second fuel pump based on modifying the flowrate of the second fuel and the first fuel based on the concentration of the water in the second fuel.

9. The controller of claim 8, wherein the first fuel comprises diesel and the second fuel comprises methanol, ethanol, n-propyl alcohol, isopropyl alcohol, or t-butyl alcohol.

10. The controller of claim 8, further comprising computer-executable instructions causing the processor to perform acts comprising:

receiving a volumetric flowrate of mixed fuel in the fuel line from a flowrate sensor; and modifying the first pump signal, the second pump signal, or the mixing signal based on the volumetric flowrate.

11. The controller of claim 8, further comprising computer-executable instructions causing the processor to perform acts comprising outputting an injector signal to control an opening and closing of the injector based on the power signal.

12. The controller of claim 8, wherein water sensor is configured to measure a specific gravity of the second fuel to generate the water volume signal.

13. The controller of claim 8, wherein the water sensor is configured to measure a conductivity of the second fuel to generate the water volume signal.

14. The controller of claim 8, further comprising computer-executable instructions causing the processor to perform acts comprising:

receiving a second power signal indicating a shutdown of the internal combustion engine; and in response to receiving the second power signal, transmitting a gas control signal to open a gas valve, wherein opening the gas valve allows nitrogen to enter the internal combustion engine to purge the internal combustion engine of the first fuel and the second fuel.

15. A method of operating an internal combustion engine, comprising:

receiving a power signal indicating a desired power level of the internal combustion engine;

accessing a fuel map to calculate a default ratio of a second fuel to a first fuel and a flowrate of the first fuel and the second fuel, wherein the fuel map is a table indicating that for a power level, an amount of the first fuel and an amount of the second fuel for the power level;

calculating a concentration of water absorbed by the second fuel stored in a second fuel tank based on a water volume signal received from a water sensor;

modifying the default ratio, the flowrate of the first fuel, and the flowrate of the second fuel based on the concentration of the water in the second fuel;

outputting a mixing signal to modify a position of a mixing valve based on modifying the default ratio; and outputting a first pump signal to change the flowrate of the first fuel pump and a second pump signal to change the flowrate of the second fuel pump based on modifying the flowrate of the second fuel and the first fuel based on the concentration of the water in the second fuel.

16. The method of claim 15, wherein the first fuel comprises diesel and the second fuel comprises methanol, ethanol, n-propyl alcohol, isopropyl alcohol, or t-butyl alcohol.

17. The method of claim 15, further comprising:

receiving a volumetric flowrate of mixed fuel in a fuel line from a flowrate sensor; and modifying the first pump signal, the second pump signal, or the mixing signal based on the volumetric flowrate.

18. The method of claim 15, further comprising outputting an injector signal to control an opening and closing of the injector based on the power signal.

19. The method of claim 15, further comprising measuring a specific gravity of the second fuel to generate the water volume signal.

20. The method of claim 15, further comprising measuring a conductivity of the second fuel to generate the water volume signal.

* * * * *